US010927826B2

(12) United States Patent
Arnold et al.

(10) Patent No.: US 10,927,826 B2
(45) Date of Patent: Feb. 23, 2021

(54) ELECTRICAL DEVICE AND METHOD HAVING AN ELECTRICAL CORD SET CONVERTIBLE BETWEEN DIFFERENT ELECTRICAL AMPERAGE RATINGS

(71) Applicant: Sunrise Global Marketing, Mooresville, NC (US)

(72) Inventors: Greg Arnold, Mooresville, NC (US); Kevin Gillis, Mooresville, NC (US); Nick Suchoza, Mooresville, NC (US)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 68 days.

(21) Appl. No.: 16/325,748

(22) PCT Filed: Aug. 22, 2017

(86) PCT No.: PCT/US2017/047939
§ 371 (c)(1),
(2) Date: Feb. 15, 2019

(87) PCT Pub. No.: WO2018/039187
PCT Pub. Date: Mar. 1, 2018

(65) Prior Publication Data
US 2019/0181718 A1 Jun. 13, 2019

Related U.S. Application Data

(60) Provisional application No. 62/378,196, filed on Aug. 22, 2016.

(51) Int. Cl.
H02K 5/22 (2006.01)
H02K 11/27 (2016.01)
(Continued)

(52) U.S. Cl.
CPC .............. F04B 35/04 (2013.01); F04B 35/06 (2013.01); F04B 41/02 (2013.01); F04B 49/06 (2013.01);
(Continued)

(58) Field of Classification Search
CPC .......... F04B 35/04; F04B 49/06; F04B 35/06; F04B 41/02; F04B 49/065; F04B 49/20;
(Continued)

(56) References Cited

U.S. PATENT DOCUMENTS 6,380,852 B1* 4/2002 Hartman ................ H04B 15/02
340/521
6,700,333 B1 3/2004 Hirshi et al.
(Continued)

OTHER PUBLICATIONS

Search Report in related International Patent Application No. PCT/EP2017/047939 dated Nov. 6, 2017; 1 page.

Primary Examiner — John K Kim
(74) Attorney, Agent, or Firm — Rooney IP, LLC

(57) ABSTRACT

An electrically operated device (10) includes an electric motor (36) with an electrical cord set (30). The cord set (30) includes an electrical connecting plug (80) for coupling with an AC electrical outlet. The device (10) further includes a detector (46). A control (42) is electrically coupled to the motor (36) and electrically coupled to the detector (46) for controlling the level of electric current drawn by the electric motor (36) from the AC electrical outlet. The detector (46) detects whether the electrical connecting plug (80) is connected to a 15 Amp electric receptacle or to a 20 Amp electric receptacle and, in response, the control (42) establishes the electric profile of the electric motor (36) to correspond to the 15 Amp electric receptacle or to the 20 Amp electric receptacle.

8 Claims, 2 Drawing Sheets

(51) Int. Cl.
　　　F04B 49/06　　(2006.01)
　　　H01R 13/35　　(2006.01)
　　　H01R 27/00　　(2006.01)
　　　H01R 31/06　　(2006.01)
　　　F04B 35/04　　(2006.01)
　　　H02J 7/35　　(2006.01)
　　　H02J 9/06　　(2006.01)
　　　F04B 35/06　　(2006.01)
　　　F04C 28/06　　(2006.01)
　　　F04C 29/00　　(2006.01)
　　　F04B 41/02　　(2006.01)
　　　F04B 49/20　　(2006.01)
　　　H01R 13/66　　(2006.01)
　　　H01R 103/00　　(2006.01)
(52) U.S. Cl.
　　　CPC ............ F04B 49/065 (2013.01); F04B 49/20 (2013.01); F04C 28/06 (2013.01); F04C 29/0085 (2013.01); H01R 13/35 (2013.01); H01R 27/00 (2013.01); H01R 31/06 (2013.01); H02J 7/35 (2013.01); H02J 9/06 (2013.01); H02K 5/225 (2013.01); H02K 11/27 (2016.01); *F04B 2203/0212* (2013.01); *F04C 2210/1005* (2013.01); *F04C 2270/075* (2013.01); *H01R 13/6683* (2013.01); *H01R 2103/00* (2013.01); *H01R 2201/10* (2013.01).

(58) Field of Classification Search
CPC . F04B 2203/0212; H02K 11/27; H02K 5/225; H01R 13/35; H01R 27/00; H01R 31/06; H01R 13/6683; H01R 2103/00; H01R 2201/10; F04C 28/06; F04C 29/0085; F04C 2210/1005; F04C 2270/075; H02J 7/35; H02J 9/06
USPC .......................................................... 310/71
See application file for complete search history.

(56) References Cited

U.S. PATENT DOCUMENTS

| 2005/0250375 | A1* | 11/2005 | Allison | H01R 31/06 |
| | | | | 439/502 |
| 2007/0077153 | A1* | 4/2007 | Austen | F04B 35/04 |
| | | | | 417/53 |
| 2007/0296223 | A1 | 12/2007 | Saylor | |
| 2009/0212964 | A1 | 8/2009 | Hibma | |
| 2016/0075246 | A1* | 3/2016 | Liptak | H02J 7/007 |
| | | | | 320/109 |
| 2019/0181718 | A1* | 6/2019 | Arnold | F04B 49/065 |

* cited by examiner

ELECTRICAL DEVICE AND METHOD HAVING AN ELECTRICAL CORD SET CONVERTIBLE BETWEEN DIFFERENT ELECTRICAL AMPERAGE RATINGS

CROSS-REFERENCE TO RELATED APPLICATION

The application claims priority to U.S. Provisional Application Ser. No. 62/378,196, filed Aug. 22, 2016 (pending), the disclosure of which is hereby incorporated by reference herein.

This application is also generally related to U.S. Provisional Application Ser. No. 62/384,531, filed Sep. 7, 2016 (pending), the disclosure of which is hereby incorporated by reference herein.

TECHNICAL FIELD

The present invention generally relates to electrical devices and, more specifically, relates to devices with electric motors and electric cord sets that are rated for use with either 15 Amp receptacles or 20 Amp receptacles and associated AC circuits.

BACKGROUND

Standard AC electrical power receptacles or outlets in the United States are rated for use generally with 15 Amp or 20 Amp electrical circuits, although the actual electric current profile at any given electric outlet or receptacle can vary based on the circuit design or other factors. Lighter duty electrically operated devices, such as blow dryers, small hand tools and the like will operate off a 15 Amp electric receptacle. Therefore, these devices will have a standard twin prong electrical connecting plug on the cord set. Heavier duty equipment or appliances may instead run off a 20 Amp receptacle. These devices will have a cord set with a plug having one standard vertically oriented prong and another horizontal prong or horizontal prong portion. Generally, a 15 Amp electrical connecting plug will physically and electrically couple to 15 Amp receptacles and 20 Amp receptacles, assuming the 20 Amp receptacle includes twin vertically oriented slots with one of those slots further including a horizontal slot portion. However, a 20 Amp electrical connecting plug is uniquely configured such that it will only physically couple with a 20 Amp electric receptacle. This difference in design configuration ensures that a 20 Amp plug may not be inserted into a 15 Amp receptacle and then potentially overload that circuit. There are instances, however, in which it would be desirable to allow a tool, piece of equipment, or other electrically operated device to draw electric current from either a 15 Amp receptacle or a 20 Amp receptacle. For example, an air compressor or a power washer could be safely designed to use either type of power supply circuit and produce higher performance when operated from the higher rated 20 Amp receptacle. When using a higher rated electric power outlet, such equipment could have performance levels approaching those associated with corresponding gasoline powered equipment.

For these and other reasons, it would be desirable to provide an electrically operated device with a cord set that may be effectively used to operate the device from either a 15 Amp or a 20 Amp electric receptacle.

SUMMARY

Generally, in an illustrative embodiment the invention provides an electrically operated device including an electric motor having an electrical cord set with an electrical connecting plug for coupling with an AC electrical outlet. The electric motor may be an AC motor or a DC motor, for example. In the case of a DC motor, AC input power would first be converted to DC power. The electrical connecting plug further includes a detector. A control is electrically coupled to the motor and electrically coupled to the detector for controlling the level of electric current drawn by the electric motor from the AC electrical outlet. The detector detects whether the electrical connecting plug is connected to a 15 Amp electric receptacle or to a 20 Amp receptacle and, in response, the control establishes the electric profile of the electric motor in a manner corresponding to whether the electrical connecting plug is connected to the 15 Amp electric receptacle or to the 20 Amp electric receptacle.

The cord set may further include an adaptor plug. In this exemplary embodiment, the electrical connecting plug is a 15 Amp plug configured to fit into a 15 Amp electric receptacle and the adaptor plug is a 20 Amp plug for receiving and electrically connecting with the 15 Amp connecting plug and having electric conducting prongs uniquely configured to fit into the 20 Amp electric receptacle. The detector detects whether the electrical connecting plug is physically and electrically connected to the adaptor plug and, in response, the control establishes the electric profile of the electric motor to corresponding to the 20 Amp electric receptacle. The detector may comprise an electric sensor, for example, of any suitable form. Examples are electric switches or proximity sensors, or the detector may be a mechanical switch. Alternatively, the electrical connecting plug is a 20 Amp plug configured to fit into a 20 Amp electric receptacle and the adaptor plug is a 15 Amp plug for receiving and electrically connecting with the 20 Amp connecting plug and having electric conducting prongs configured to fit into the 15 Amp electric receptacle. The detector detects whether the electrical connecting plug is physically and electrically connected to the adaptor plug and, in response, the control establishes the electric profile of the electric motor to corresponding to the 15 Amp electric receptacle.

The detector may further comprise a movable element configured to be inserted into the 20 Amp electric receptacle and further operable to be moved from a first position to a second position upon insertion of the electrical connecting plug into the 15 Amp receptacle. The movable element may be spring loaded into the first position, and the detector may further comprise an electric sensor, such as a switch, electrically coupled to the control and actuated when the movable element moves to the second position to indicate to the control that the electrical connecting plug element is physically and electrically coupled to the 15 Amp electric receptacle. The device may comprise any desired electrically operated device as generally described but examples include home improvement tools, such as air compressors or pressure washers.

In other illustrative embodiments the invention provides an electrically operated device including an electric motor having an electrical cord set with an electrical connecting plug for coupling with an AC electrical outlet. The electric motor may be an AC motor or a DC motor, for example. In the case of a DC motor, AC input power would be converted to DC power for use by DC powered components of the device. The electrically operated device includes a detector. The detector may be configured and take the forms as generally described herein, such as being an electric switch or sensor. However, the detector need not be carried by an electric connecting plug. The detector may be located in any desired location, such as elsewhere on the electrically operated device, and may be manually activated by a user to indicate whether the cord set is electrically coupled to a 15 Amp electric receptacle or to a 20 Amp electric receptacle. A control is electrically coupled to the motor and electrically coupled to the detector for controlling the level of electric current drawn by the electric motor from the AC electrical outlet. The detector detects whether the electrical connecting plug is connected to a 15 Amp electric receptacle or to a 20 Amp receptacle and, in response, the control establishes the electric profile of the electric motor in a manner corresponding to whether the electrical connecting plug is connected to the 15 Amp electric receptacle or to the 20 Amp electric receptacle.

The invention also generally provides a method of operating an electrical device generally including an electric motor coupled with an electrical cord set. The cord set includes an electrical connecting plug for coupling with an AC electrical outlet. The method comprises physically and electrically coupling the electrical connecting plug to the AC electrical outlet; detecting whether the electrical connecting plug is coupled to either a 15 Amp receptacle or a 20 Amp receptacle; and using the control to set the level of electric current to be drawn by the motor corresponding to the detected receptacle.

The electrical connecting plug may be configured to fit into a 15 Amp electric receptacle and the cord set may further include an adaptor plug. The adaptor plug is uniquely configured to fit into the 20 Amp receptacle. In this example, the step of physically and electrically coupling the electrical connecting plug further comprises physically and electrically coupling the adaptor plug to the electrical connecting plug; and physically and electrically coupling the adaptor plug to the 20 Amp electric receptacle. Alternatively, the electrical connecting plug may be configured to fit into a 20 Amp electric receptacle and the cord set may further include an adaptor plug. The adaptor plug is configured to fit into the 15 Amp receptacle. In this example, the step of physically and electrically coupling the electrical connecting plug further comprises physically and electrically coupling the adaptor plug to the electrical connecting plug; and physically and electrically coupling the adaptor plug to the 15 Amp electric receptacle.

The detecting step may further comprise actuating at least one electric sensor, such as a proximity sensor or switch. The detecting step may further comprise using an element operable to be inserted into the 20 Amp receptacle and operable to be moved from a first position to a second position upon insertion of the electrical connecting plug into the 15 Amp receptacle. The method may further comprise inserting the electrical connecting plug into the 15 Amp receptacle, moving the element to the second position against the force of a spring, detecting the 15 Amp electric receptacle by actuating an electric sensor with the element in the second position, and sending an electric signal from the electric sensor to the control to indicate to the control that the electrical connecting plug is coupled to the 15 Amp receptacle.

Various additional objectives, advantages, and features of the invention will be appreciated from a review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
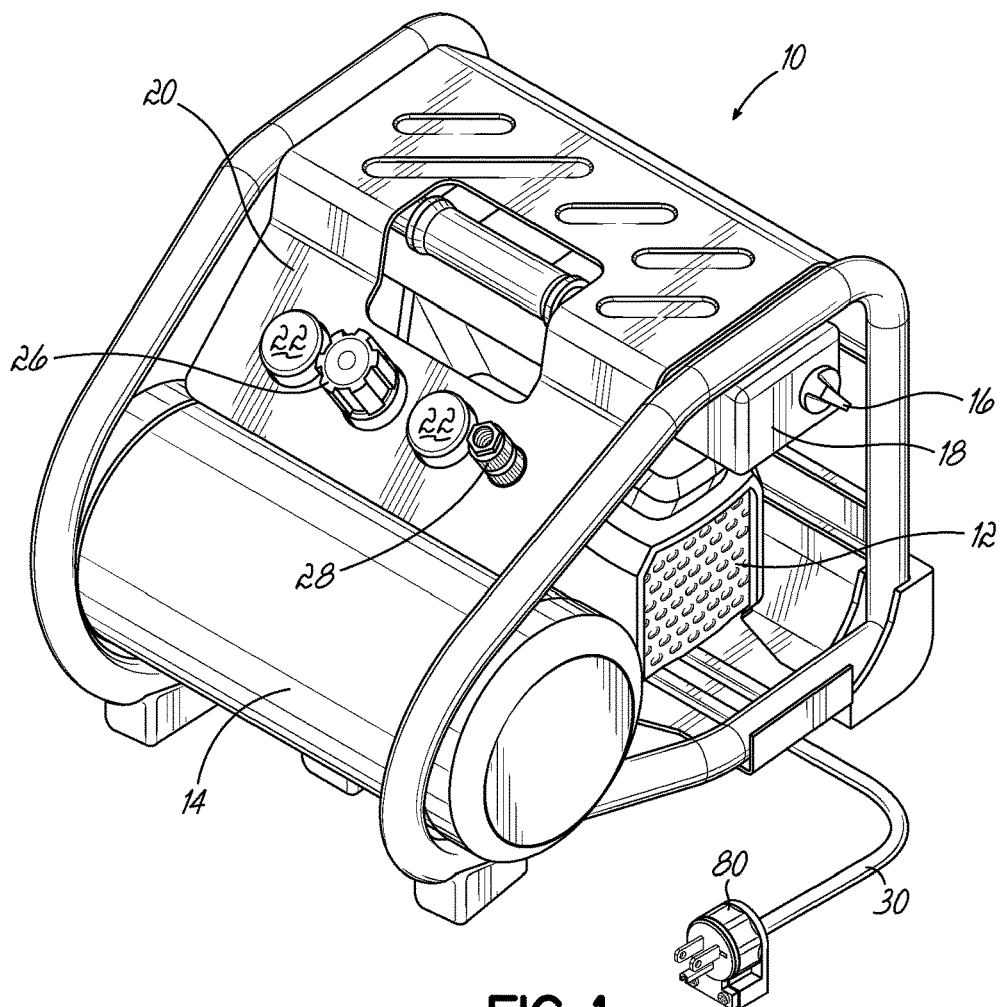
FIG. 1 is a perspective view of an air compressor and associated electrical cord set constructed according to an illustrative embodiment of the invention.
Figure 2:
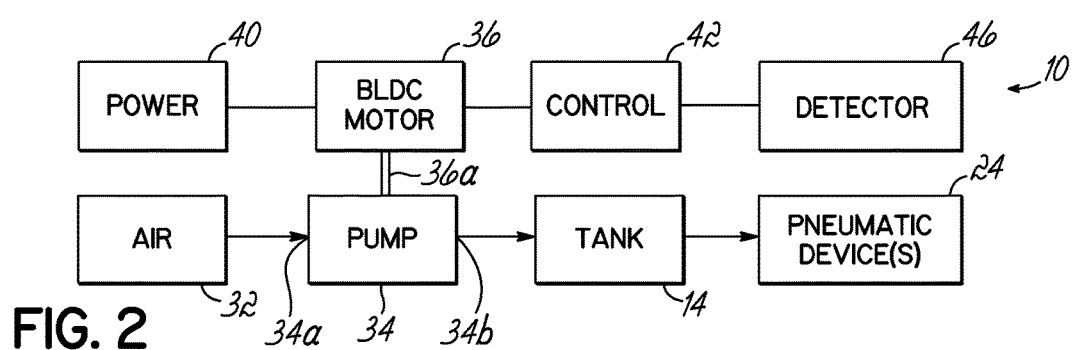
FIG. 2 is a block diagram showing the air compressor of FIG. 1 in diagrammatic form.

Referring first to FIG. 1, an electrically operated air compressor 10 is shown and generally includes an electric motor and an air pump contained in a housing 12, and an air tank 14. A knob 16 is provided on a power control box 18 for turning the air compressor 10 on and off. The air compressor 10 further includes a control panel 20 that includes dials or gauges as needed. For example, one or more air pressure gauges 22 may be provided for displaying air pressure being delivered to one or more pneumatic device(s) 24 (FIG. 2). An air pressure regulating knob 26 is provided, as well as a hose connector 28 for the pneumatic device(s) 24. An electric cord set 30 extends from the air compressor 10 and may be plugged into an AC receptacle (not shown in FIG. 1). The AC power delivered at the receptacle may be approximately 100V to 120V in the United States, but this may vary depending on various factors.

Figure 3:
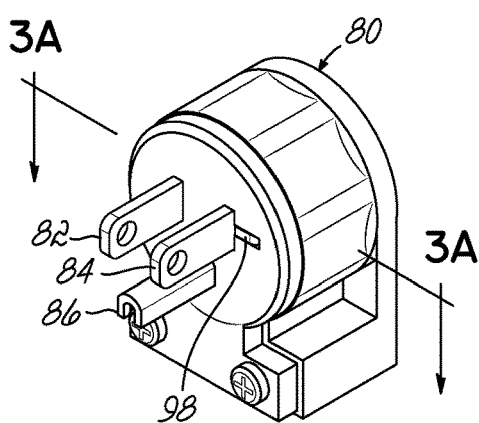
FIG. 3 is a perspective view of an electrical connecting plug constructed in accordance with one illustrative embodiment of the invention.
Figure 4:
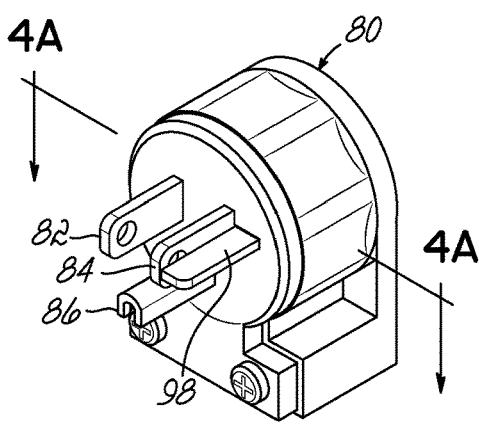
FIG. 4 is a perspective view of the electrical connecting plug shown in FIG. 3, but illustrating the movable element in an extended position for use in a 20 Amp electrical outlet.

FIG. 2 illustrates, in block diagram form, the electrically operated air compressor of FIG. 1. Like reference numerals in FIGS. 1 and 2 refer to like structure and associated function. Air 32 from the surrounding environment, for example, enters an air pump 34 through a pump inlet 34a. The air pump 34 is operated by way of a rotatable output or shaft 36a of a brushless DC motor 36. The brushless DC motor 36 receives electric power from a suitable electric power supply 40 which is typically a wall outlet or receptacle supplying AC power. The power controls of the air compressor 10 will then include an AC/DC converter to convert the AC power to DC power for use by the motor 36. The brushless DC motor 36 is controlled by suitable control components represented by a control block 42. The control 42 may, for example, comprise a programmable microprocessor-based control such as a PC board. The pump 34 supplies pressurized air through an outlet 34b to the tank 14. One or more pneumatic devices 24, such as pneumatically operated tools, receive pressurized air from the tank 14 during operation. The air pump 34 will recharge or re-pressurize the tank 14 as the pressurized air is depleted by operation of the pneumatic devices 24. Typically, the air pump 34 actuates or turns on intermittently for this purpose. As will be discussed further below, a detector 46 is electrically coupled to the control 42 for detecting whether the cord set 30 (FIG. 1) is physically and electrically coupled with a 15 Amp electric receptacle or a 20 Amp electric receptacle, as will be discussed in more detail below, in connection with FIGS. 3 through 5. Generally, the detector 46 may be a mechanical or electronic switch manually activated by a user, or automatically activated when the cord set 30 is physically and electrically coupled to the AC electric outlet. Although the more automated manners of activating the detector 46 are shown and described herein in greater detail, it will be appreciated that the detector 46, in a more basic form, may comprise a selector switch of the air compressor 10 or other electrically operated device allowing the user to select between use of a 15 Amp electric receptacle and a 20 Amp electric receptacle.

Figure 2A:
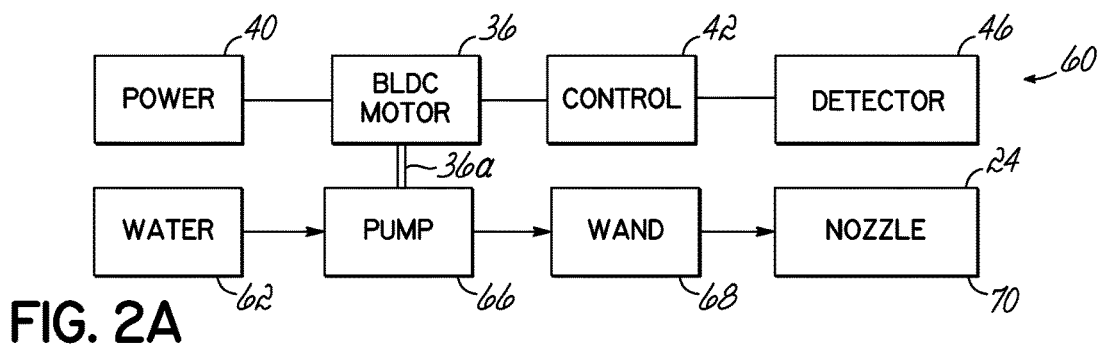
FIG. 2A is a block diagram showing a pressure washer in diagrammatic form as another illustrative electrically operated device constructed in accordance with the invention.

FIG. 2A illustrates a pressure washer 60 in block diagram form. Again, like reference numerals in FIG. 2A refer to like structure and associated function as generally described in FIGS. 1 and 2. This provides one of many possible further examples of electrically operated devices that may be constructed in accordance with concepts of the present invention. The pressure washer 60 uses a supply of water 62, which may simply be a hose connected to a water supply line such as at a home or business, coupled with an electrically operable water pump 66. The pump 66 is coupled with a wand 68, and a nozzle 70 is connected at the end of the wand 68 in any desired manner. The pump 66 is operated by a brushless DC motor 36 and, particularly, by the rotatable output 36a of the brushless DC motor 36. The brushless DC motor 36 receives power from an AC power supply 40 as is the case with the air compressor 10 described above. Likewise, the brushless DC motor 36 is coupled with a control 42 and a detector 46 as generally described above and examples of which are more specifically described below.

It will therefore be appreciated that in the case of the air compressor 10, the pressure washer 60, or any electrically operated device to which features of the present invention are directed, such electrically operated devices will generally comprise an electric motor 36 including an electrical cord set 30 (FIG. 1), and a control 42 electrically coupled to the motor 36 and electrically coupled to the detector 46. As further described below and exemplified through various embodiments whether or not shown and described herein, the electrical cord set 30 includes at least a first electrical connecting plug, such as plug 80 (FIG. 1) for coupling with an AC electrical outlet or receptacle. The electrical connecting plug 80 further includes a detector 46. It will be appreciated that in certain embodiments, the cord set 30 may include more than one electrical connecting plug. For example, the detector 46 may comprise a user activated switch that allows selection between a 15 Amp plug configured to be physically and electrically coupled to a 15 Amp electric receptacle and a 20 Amp plug uniquely configured to be physically and electrically coupled to a 20 Amp receptacle. The control, in this case, receives a signal from the user activated detector 46 and establishes a unique electric power profile, such as an electric current draw profile, for the motor 36 that corresponds to the detected 15 Amp or 20 Amp receptacle chosen by the user. As mentioned, the control 42 is electrically coupled to the motor 36 and electrically coupled to the detector 46 for controlling the electric profile, such as the level of electric current drawn by the electric motor 36 from the electrical outlet. In this regard, the detector 46 generally detects whether the electrical connecting plug is electrically connected to a 15 Amp electric receptacle or to a 20 Amp electric receptacle. In response, the control 42 causes the electric motor 36 to establish an electrical power or current profile of the motor 36 corresponding to the 15 Amp electric receptacle or to the 20 Amp electric receptacle. While the electric motor 36 is a brushless DC motor in these examples, it may be any type of AC or DC powered motor.

Figure 3A:
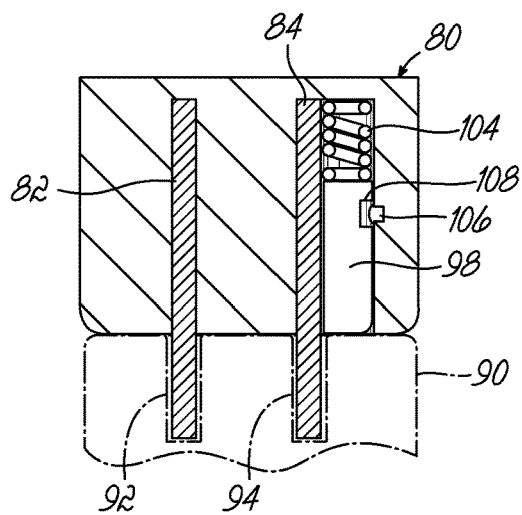
FIG. 3A is a cross sectional view taken along line 3A-3A of FIG. 3, and showing the plug inserted into a 15 Amp electrical outlet thereby moving an element and actuating an electric sensor which combine to form a detector.

FIGS. 3, 3A, 4 and 4A show one illustrative embodiment of an electrical connecting plug 80 embodying the invention. In this regard, the electrical connecting plug 80 includes a pair of generally standard straight and flat, vertically oriented electrical conducting prongs 82, 84 and also a grounding prong 86 to thereby form a three prong electrical connecting plug 80. As shown in FIG. 3A, the electrical connecting plug 80 is inserted into an AC electrical outlet or receptacle 90 such that the pair of electrically conductive prongs 82, 84 physically couple or mate with and electrically couple with receiving apertures 92, 94 in the outlet 90. Although not shown in FIG. 3A, the grounding prong 86 is received within the electrical outlet or receptacle 90 in a conventional manner. It will be appreciated that the terms "outlet" or "receptacle" are meant to include either standard wall outlets, or receiving receptacles of other forms such as extension cords and any similar coupling components for transferring electricity.

Figure 4A:
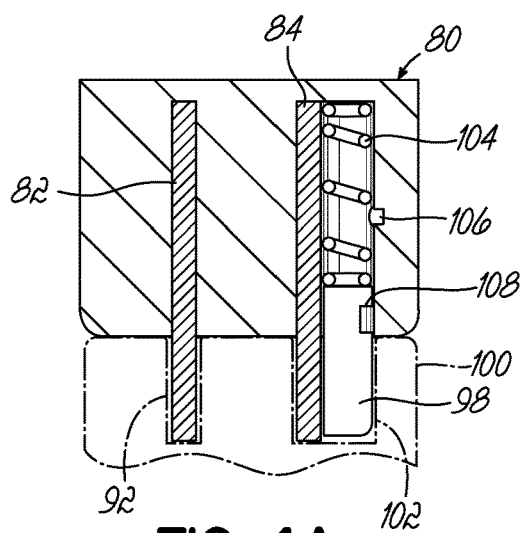
FIG. 4A is a cross sectional view taken along line 4A-4A of FIG. 4, and showing the plug inserted into a 20 Amp electrical outlet with the movable element in the extended position.

The electrical connecting plug 80 of this embodiment includes a movable element 98 operable to be inserted into 20 Amp electric receptacle 100, as shown in FIG. 4A. In this regard, when extended into a first position as shown in FIG. 4A, the electrical connecting plug 80 will be insertable into the standard 20 Amp electric receptacle which is an electric prong receiving receptacle with a horizontal slot 102 that receives the horizontally oriented movable element 98. Electric current may then be directed from the 20 Amp receptacle 100 through the twin prongs 82, 84 and used to operate the electric motor 36 (FIGS. 2 and 2A) of the electrically operated device. In the position shown in FIG. 4A, the movable element 98 is spring-biased into the outward position by a coil spring 104, as shown. An electric switch or any suitable proximity sensor or switch device 106, 108 may be used to detect the position of the movable element 98. This position is then communicated to the control (FIGS. 2 and 2A) to instruct the control 42 that the movable element 98 is in the first position shown in FIG. 4A and electricity is flowing. That is, when there is no control signal generated by the contact or proximity elements of the switch device 106, 108 but electricity is flowing, this indicates to the control 42 that the plug is physically and electrically coupled to the 20 Amp receptacle 100. As such, the control 42 will establish a unique electric power/current profile for the motor 36 corresponding to the 20 Amp receptacle 100. For example, the control may allow the motor 36 to draw a maximum of 20 Amps of current from the electrical circuit coupled with the receptacle 100. Again, although a brushless DC motor 36 is shown in the examples above, it will be appreciated that the motor may be any electrically-operated motor, such as a DC motor or an AC motor.

When the electrical connecting plug 80 is inserted into a standard 15 Amp receptacle 90 as shown in FIG. 3A, a horizontal slot portion in the electrical outlet or receptacle will not be present and, therefore, the movable element 98 will be depressed or moved to a second position against the force of the spring 104. In this second position, the sensor device or switch 106, 108 will be activated and thereby send a signal to the control 42 (FIGS. 2 and 2A) indicating to the control 42 that the electrical connecting plug 80 is physically and electrically coupled to the 15 Amp receptacle. In this manner, the control 42 will be instructed to establish an electric power/current profile corresponding to the use of the 15 Amp receptacle 90. For example, the control may allow the motor 36 to draw a maximum of 15 Amps of electric current from the 15 Amp receptacle 90 associated with the power supply 40 to power the associated electrically operated device, such as the air compressor 10 or pressure washer 60 described above.

Figure 5:
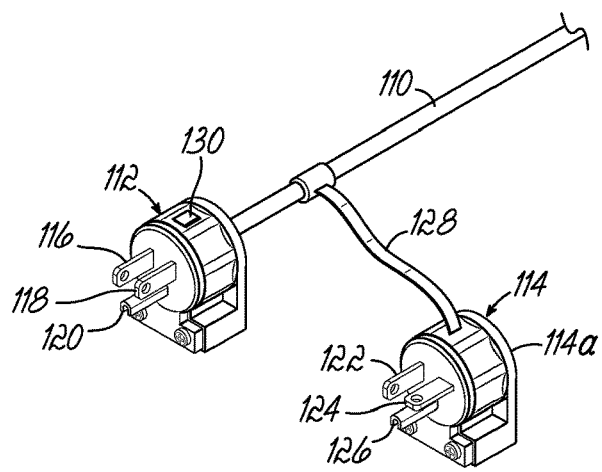
FIG. 5 is a perspective view showing another electrical cord set constructed according to another illustrative embodiment of the invention.

In another embodiment, shown in FIG. 5, a cord set 110 includes an electrical connecting plug 112 and an adaptor plug 114. The electrical connecting plug 112 in this embodiment may be a 15 Amp plug that is configured with electrical conducting prongs as described above to fit into a 15 Amp electric receptacle and, for this purpose, includes the standard pair of twin electrical conducting prongs 116, 118 and the grounding prong 120. The adaptor plug 114 is a 20 Amp plug uniquely configured to fit into a 20 Amp electric receptacle by including a first electrical conducting prong 122 and a second, horizontally oriented electrical conducting prong 124 or prong portion, along with a standard grounding prong 126. The adaptor plug 114 is attached or tethered to the power cord 110 by a strap or similar element 128. The adaptor plug 114 includes a rear receptacle portion 114a that is configured to physically and electrically couple to the conducting prongs 116, 118, 120 of the 15 Amp plug In this embodiment, although each of the plugs 112, 114 may include a respective sensor that serves as the detector 46 (FIGS. 2 and 2A), only the 15 Amp connecting plug 112 is shown with a sensor 130. The sensor 130 is used by the control 42 to sense which one of the plugs 112, 114 is connected to an electrical outlet. For example, if the electrical connecting plug 112 is electrically and physically coupled to a 15 Amp receptacle, a sensor or switch 130 carried by the first electrical connecting plug 112 sends a signal indicating such to the control 42 (FIGS. 2 and 2A) thereby instructing the control 42 to establish an electric profile for the motor 36 corresponding to the 15 Amp receptacle. For example, this power profile may allow the draw of a maximum of 15 Amps of electric current from the receptacle and/or power supply 40. On the other hand, if the receptacle portion 114a of the adaptor plug 114 is electrically and physically coupled to the prongs 116, 118, 120 of the 15 Amp plug 112, and its prongs 122, 124, 126 are physically and electrically coupled to a 20 Amp receptacle, this can trip the sensor or switch 130 to a position indicating attachment of the adaptor plug 114 to plug 112. In this case, the control 42 will establish an electric power and/or current profile for the motor 36 which corresponds to the 20 Amp electric receptacle. For example, the profile may allow the motor 36 to draw a maximum of 20 Amps of electric current from the 20 Amp receptacle and/or power supply 40. Of course, the reverse may be possible as well and the 20 Amp adaptor plug 114 may include a sensor (not shown) while the 15 Amp electrical connecting plug 112 includes no sensor. In this case, the control 42 would set the electric profile for a 15 Amp electric receptacle when it detects electricity flowing (indicating coupling of plug 112 to a receptacle), but detects no control signal. Upon coupling of the adaptor 114 including a sensor to the plug 112, the sensor would be tripped indicating to the control 42 to set the electric profile for the motor to correspond to the 20 Amp electric receptacle. Alternatively, the connecting plug 112 may be the 20 Amp plug and the adaptor plug may be the 15 Amp plug and corresponding changes may be made to the system for ensuring that the control establishes the correct electric profile depending on which plug is coupled to an electrical receptacle.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with the preferred methods of practicing the present invention as currently known. However, the invention itself should only be defined by the appended claims.

What is claimed is:

1. An electrically operated device, comprising:
an electric motor including an electrical cord set with an electrical connecting plug for coupling with an AC electrical outlet, the electrical connecting plug further including a detector; and
a control electrically coupled to the motor and electrically coupled to the detector for controlling the level of electric current drawn by the electric motor from the AC electrical outlet, wherein the detector detects whether the electrical connecting plug is connected to a 15 Amp electric receptacle or to a 20 Amp electric receptacle and, in response, the control establishes the electrical profile of the electric motor in a manner corresponding to whether the electrical connecting plug is connected to the 15 Amp electric receptacle or to the 20 Amp electric receptacle. the detector further including a movable element configured to be inserted into the 20 Amp electric receptacle and further operable to be moved from a first position to a second position upon insertion of the electrical connecting plug into the 15 Amp electric receptacle;
wherein the movable element is spring loaded into the first position, and the detector further comprising an electric sensor electrically coupled to the control and actuated when the movable element moves to the second position to indicate to the control that the electrical connecting plug is physically and electrically coupled to the 15 Amp electric receptacle.

2. The electrically operated device of claim 1, wherein the cord set further includes an adaptor plug, the electrical connecting plug being a 15 Amp connecting plug configured to fit into the 15 Amp electric receptacle and the adaptor plug being a 20 Amp plug for receiving and electrically connecting with the 15 Amp connecting plug and uniquely configured to fit into the 20 Amp electric receptacle.

3. The electrically operated device of claim 2, wherein the detector detects whether the electrical connecting plug is physically and electrically connected to the adaptor plug and, in response, the control establishes the electrical profile of the electric motor to correspond to the 20 Amp electric receptacle.

4. The electrically operated device of claim 1, wherein the cord set further includes an adaptor plug, the electrical connecting plug being a 20 Amp connecting plug configured to fit into the 20 Amp electric receptacle and the adaptor plug being a 15 Amp plug for receiving and electrically connecting with the 20 Amp connecting plug and configured to fit into the 15 Amp electric receptacle.

5. The electrically operated device of claim 4, wherein the detector detects whether the electrical connecting plug is physically and electrically connected to the adaptor plug and, in response, the control establishes the electrical profile of the electric motor to correspond to the 15 Amp electric receptacle.

6. The electrically operated device of claim 1, wherein the device further comprises a home improvement tool.

7. The electrically operated device of claim 6, wherein the home improvement tool further comprises an air compressor.

8. The electrically operated device of claim 6, wherein the home improvement tool further comprises a pressure washer.

\* \* \* \* \*